United States Patent [19]
Saito et al.

[11] Patent Number: 5,377,339
[45] Date of Patent: Dec. 27, 1994

[54] COMPUTER FOR SIMULTANEOUSLY EXECUTING INSTRUCTIONS TEMPORARILY STORED IN A CACHE MEMORY WITH A CORRESPONDING DECISION RESULT

[75] Inventors: Mitsuo Saito; Kenji Minagawa; Takeshi Aikawa, all of Tokyo, Japan

[73] Assignee: Kabushiki Kaisha Toshiba, Kanagawa, Japan

[21] Appl. No.: 191,069

[22] Filed: Feb. 3, 1994

Related U.S. Application Data

[63] Continuation of Ser. No. 676,702, Mar. 29, 1991, abandoned.

[30] Foreign Application Priority Data

Mar. 30, 1990 [JP] Japan .................................. 2-84607

[51] Int. Cl.$^5$ .............................. G06F 9/00; G06F 9/38
[52] U.S. Cl. .................................. 395/375; 395/800; 364/230.3; 364/262.4; 364/263.1; 364/DIG. 1
[58] Field of Search ............... 395/375, 425, 650, 800, 395/250

[56] References Cited

U.S. PATENT DOCUMENTS

| | | | |
|---|---|---|---|
| 4,437,149 | 3/1984 | Pomerene et al. | 395/425 |
| 4,722,050 | 1/1988 | Lee et al. | 395/375 |
| 4,858,105 | 8/1989 | Kuriyama et al. | 395/375 |
| 4,916,652 | 4/1990 | Schwarz et al. | 364/748 |
| 5,027,270 | 6/1991 | Riodran et al. | 395/425 |
| 5,075,844 | 12/1991 | Jardine et al. | 395/375 |
| 5,099,421 | 3/1992 | Buerkle et al. | 395/375 |
| 5,197,135 | 3/1993 | Eickemeyer et al. | 395/375 |

OTHER PUBLICATIONS

IBM Product Design and Development Advanced Workstations Division, IBM RISC System/6000 Technology, pp. 2-98.

Primary Examiner—Alyssa H. Bowler
Assistant Examiner—Alpesh M. Shah
Attorney, Agent, or Firm—Finnegan, Henderson, Farabow, Garrett & Dunner

[57] ABSTRACT

A computer for simultaneously executing plural instructions decides the kind of operation and the possibility of simultaneous execution for the plural instructions as the instructions are read out from a main memory to a cache memory. The plural instructions and a corresponding decision result are stored in the cache memory. The decision process is performed for several groups of the plural instructions read out from the main memory to the cache memory in order. Then, the plural instructions are respectively assigned to a corresponding operation unit according to the decision result, and are subsequently executed by the corresponding operation unit. As a result of this arrangement, the repeated decision process for the plural instructions is not necessary when they are later read out from the cache memory to the operation unit.

11 Claims, 5 Drawing Sheets

Fig.1.

$$\begin{cases} 0 & : \text{NOP} \\ 1 & : \text{IALU 0} \\ 2 & : \text{IALU 1} \\ 3 & : \text{BRANCH} \\ 4 & : \text{EXCEPTION} \\ 5 & : \text{F-MUL} \\ 6 & : \text{F-ADD} \end{cases}$$

COMPUTER FOR SIMULTANEOUSLY EXECUTING INSTRUCTIONS TEMPORARILY STORED IN A CACHE MEMORY WITH A CORRESPONDING DECISION RESULT

This application is a continuation of application Ser. No. 07/676,702 filed Mar. 29, 1991, now abandoned.

BACKGROUND OF THE INVENTION

1. Field of the Invention

The present invention relates to a computer having a plurality of types of operation units, where the plurality of operation units can execute instructions simultaneously.

2. Description of the Background

In conventional computer systems, the computer reads out instructions one by one from a main memory and executes the instructions in order. Even though a conventional computer has a plurality of types of operation units, only one operation unit executes one instruction during any one clock cycle. Thus, the processing speed for conventional computers is low.

Recently, the plurality of types of operation units in the computer have been put to practical use. The computer reads out plural instructions from the main memory and executes the plurality of instructions simultaneously. A representative method is called "Super Scalar." In this method, the computer includes a cache memory. First, a subset of instructions stored in main memory are read out from the main memory to the cache memory. The number of the instructions to be executed simultaneously is fixed in advance. Then, the subset of the instructions are read out from the cache memory. The instructions are examined to determine the type of the operation unit required by each instruction, and the possibility of simultaneous execution. Ones of the subset of instructions are respectively supplied to corresponding operation units according to the decision result, and the operation units execute the corresponding instructions. The decision process is performed for several subsets of instructions read out from the cache memory in order.

However, in the "Super Scalar" method, a decision is made for the subsets of instructions when the instructions are read out from the cache memory to the operation unit. The cache memory stores instructions that are used repeatedly. Therefore, the system repeatedly performs the deciding step whenever the instructions are read out from the cache memory. In short, the cycle time for executing the instruction increases because of the repeated decision process.

SUMMARY OF THE INVENTION

Accordingly, it is one object of the present invention to provide a computer for simultaneously executing plural instructions, where the cycle time for executing the instruction of the computer does not increase.

It is another object of the present invention to provide a computer for simultaneously executing plural instructions, where the computer does not decide the possibility of simultaneous execution for the plural instructions when the instructions are read out from the cache memory to the operation unit.

These and other objects of the present invention are accomplished by deciding whether simultaneous execution is possible for the plural instructions when they are read out from the main memory to the cache memory. The plural instructions and decision result are stored in the cache memory. The decision process is performed for several subsets of the plural instructions read out from the main memory in order. Then, the plural instructions are immediately assigned to corresponding operation units according to the decision result. As a result of this arrangement, the repeated decision process for plural instructions is not necessary when the plural instructions are read out from the cache memory to the operation unit.

DESCRIPTION OF PREFERRED EMBODIMENTS

Figure 1:
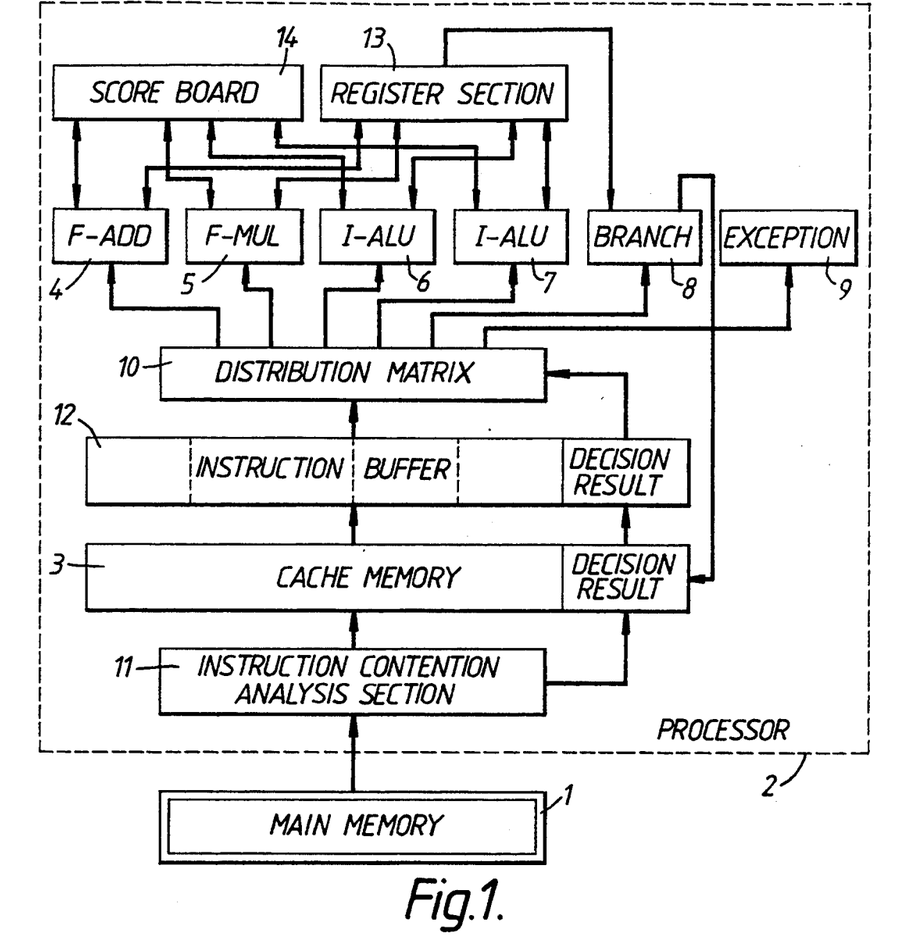
FIG. 1 shows a block diagram of a computer for simultaneously executing plural instructions according to the present invention.

FIG. 1 shows a block diagram of a computer for simultaneously executing plural instructions. A main memory 1 stores a large number of the instructions in predetermined order. A subset of the instructions are read out from the main memory 1 to a cache memory 3 inside a processor 2 and the instructions are respectively supplied to an operation unit 4-9 where they are executed. FIG. 1 shows an embodiment of the present invention including a floating-adder (F-ADD) 4, a floating-multiplier (F-MUL) 5, two integer-arithmetic logical units (I-ALU) 6 and 7, a branch-control unit 8 and an exception process unit (EXCEPTION) 9. A distribution matrix 10 supplies the plural instructions to the operation units 4-9 according to the type of operation performed by the instructions.

The subset of plural instructions are read out from the main memory 1 to the cache memory 3 at the beginning.

For example, several subsets of four instructions, which are to be repeatedly used, are read out from the main memory 1 in order.

The possibility of simultaneous execution for the four instructions is decided when they are read out from the main memory 1 to the cache memory 3 according to the present invention. The invention includes a decision means, which is embodied as an instruction contention analysis section 11. Instruction contention analysis section 11 determines the type of operation for the four instructions by referring to their operation codes and decides corresponding operation units for the four instructions respectively. Then the section 11 determines whether the types of operations are mutually different or not. If at least two of the types of operations are the same, the section 11 adds a flag to the corresponding instruction. The flag indicates that the corresponding instruction is not to be executed during the same clock cycle. The instruction contention analysis section 11 examines whether each of the same operation units corresponds to at least two of four instructions or not. If, for example, two instructions requiring the same operation unit are detected, the section 11 sets a flag of the second instruction that corresponds to the first instruction to "1." The flag belongs to the lower priority instruction of the second instruction and requires that the second instruction wait to be executed by the operation unit. The priority of instruction is defined by an address of the four instructions. The larger the address of instruction, the lower the priority of the instruction. Accordingly, the instruction corresponding to the first priority among the four instructions always has a flag value of "0". (In some embodiments, the flag bit corresponding to the first priority is omitted). In short, three instructions corresponding to the second, third, fourth priority include a flag bit for indicating the contention of the operation unit.

Figure 2:
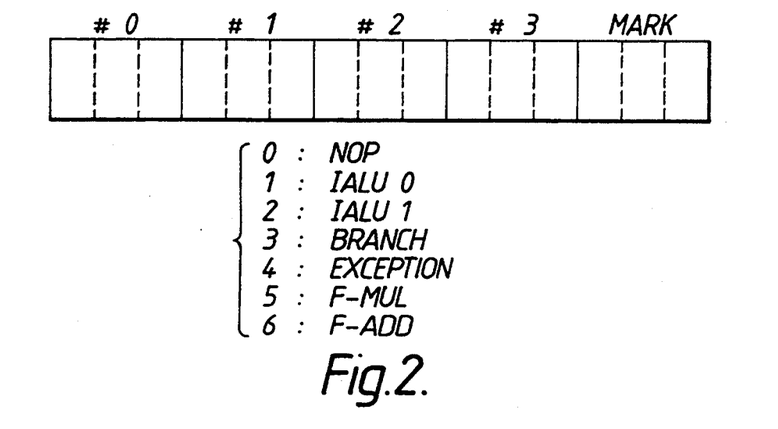
FIG. 2 shows a format of the plural instructions and the decision result according to the present invention.

FIG. 2 shows a format of a decision result output from the instruction contention analysis section 11. The format includes three bits for each instruction to indicate the type of operation for the instruction and one bit for each instruction to indicate the contention of the operation unit for one instruction (except for the first priority instruction). As shown in FIG. 2, a preferred embodiment includes seven types of operations. Therefore, three bits are necessary to indicate the type of operation. If an instruction must wait for executing because of overlap of the operation unit, the bit indicating the contention of the operation unit is set to "1". The format has fifteen bits in total, twelve bits of which respectively indicate the type of operation for four instructions (#0, #1, #2, #3) and three bits of which (MARK) respectively indicate the contention of the operation unit for three instructions (#1, #2, #3). There is no flag shown for instruction #0. Four instructions and the decision result (fifteen bits in total) are stored in the cache memory 3. The above-mentioned decision process is performed for several subsets of four instructions in the main memory 1 whenever they are read out from the main memory to the cache memory in order.

Then, four instructions and the decision result are read out from the cache memory 3 to an instruction buffer 12. The distribution matrix 10 (assignment means) reads out the four instructions with the decision result from the instruction buffer 12. The distribution matrix 10 supplies the four instructions to a corresponding operation unit 4–9 according to the decision result. At this moment, the distribution matrix 10 refers to a program counter (not shown in the Figure). The program counter indicates the address of a previously executed final instruction. The distribution matrix 10 confirms the end of execution of all four previous instructions, referring to the program counter. In applicant's invention, it is not necessary for four instructions a type of operation and contention to be decided when the instructions are read out from the cache memory to the operation unit. The distribution matrix 10 is able to immediately supply the four instructions to the operation unit according to the decision result.

After the four instructions are supplied, the operation units 4–9 read out the data from the register that is necessary for executing the instruction. (The register section 13 consists of nine registers in this example.) (See FIG. 6) At this time, the operation unit analyzes the register number to which the result of the operation is to be written according to the instruction and sets a flag corresponding to the register number in the score board 14 to "1" according to the type of operation (see FIG. 6). The score board 14 stores information that indicates whether or not the register is monopolized by the operation unit for several cycles. If the value of a register for executing the instruction is detected for the operation unit to be useless (monopolized by the other operation unit) according to the score board 14, the operation unit abandons the executed result and executes the same instruction again for next cycle.

Figure 3:
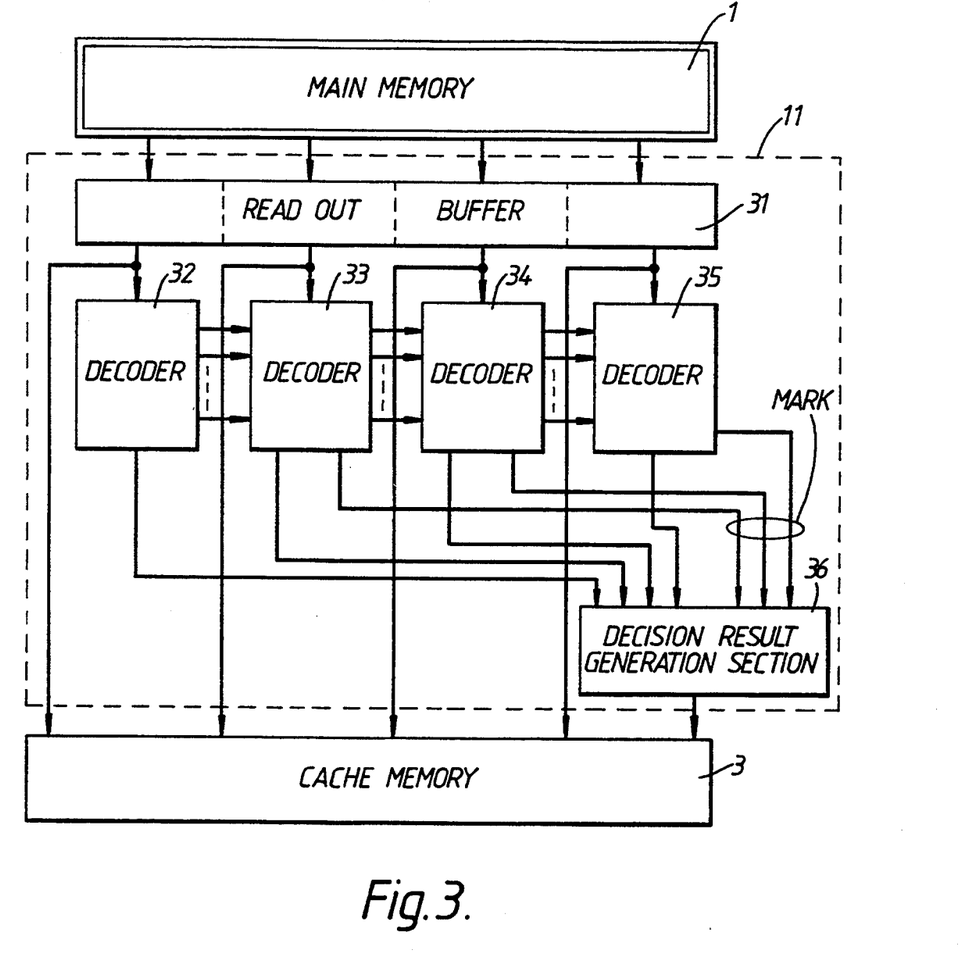
FIG. 3 shows a construction of a instruction contention analysis section according to the present invention.

FIG. 3 shows a construction of the instruction contention analysis section 11 (decision means). As shown in FIG. 3, the instruction contention analysis section 11 includes the read-out buffer 31, the four decoders 32, 33, 34, 35 and a decision result generation section 36. The read-out buffer 31 temporarily stores four instructions read-out from the main memory 1. The four instructions are respectively transferred from the read-out buffer 31 to the cache memory 3 and the four decoders 32, 33, 34, 35. The first (highest) priority instruction is transferred to the decoder 32. The fourth (lowest) priority instruction is transferred to the decoder 35. The decoders 32, 33, 34, 35 analyze the type of operation unit required to execute the instruction and the decoders 33, 34, 35 examine whether the same operation unit is required by the higher priority instruction or not. The three decoders 33, 34, 35 respectively receive the decode result of higher priority decoders 32, 33, 34 in order and decide whether the received decode result indicates contention of the operation unit or not. If the type of operation unit of the decoder is the same as the type of the operation unit of the higher priority instruction, the decoder sends a mark bit of "1". The decision result generation section 36 receives the type of operation unit and the mark bit indicating whether there is contention for the operation unit (mark bit) from the four decoders 32, 33, 34, 35 or not. The decision result generating section 36 generates the decision result as shown in FIG. 2. Then the decision result corresponding to the four instructions is stored in the cache memory 3.

Figure 4:
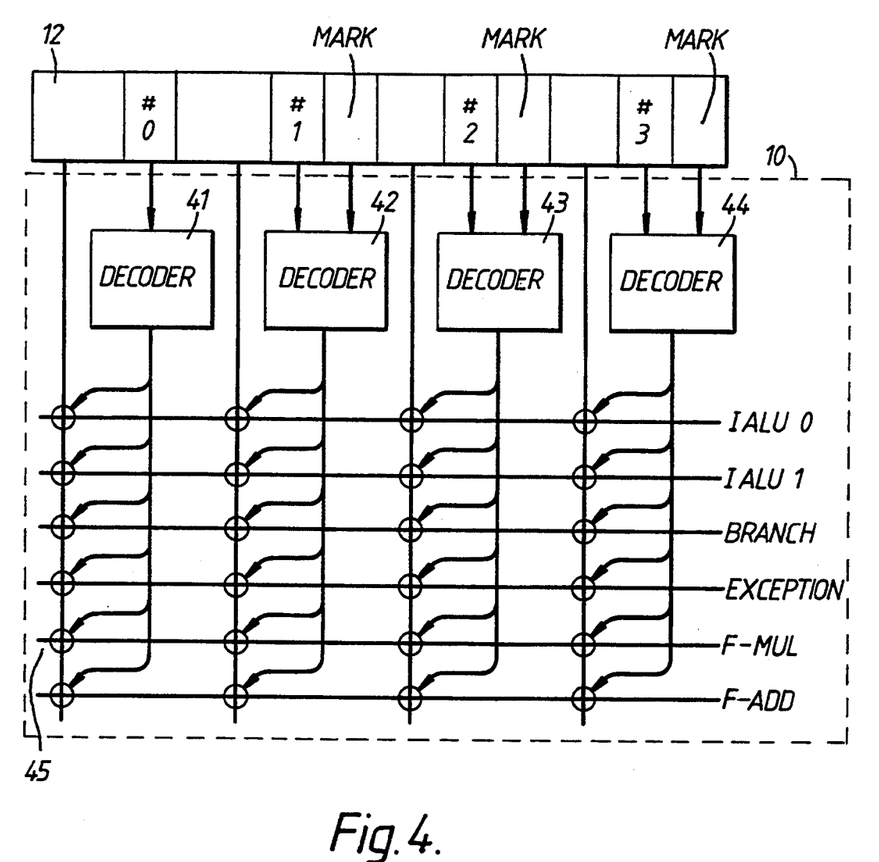
FIG. 4 shows a construction of a distribution matrix according to the present invention.

FIG. 4 shows construction of the distribution matrix 10 (assignment means). The matrix 10 includes four decoders 41, 42, 43, 44 and a switch matrix 45. Each decoder receives a type of operation unit and a contention mark from the instruction buffer 12. The decoder 41 (highest priority) receives only the type of operation unit. If the contention mark is "0", the decoder opens a gate of a switch matrix 45 corresponding to the type of operation unit. (The decoder 41 opens the gate unconditionally.) If the contention mark is "1", the decoder does not open the gate corresponding to the type of operation unit and opens the gate at a next cycle. In short, the gates of switch matrix 45 are opened by the execution timing according to the type of operation unit and the contention mark. Therefore, the plural instructions are effectively supplied to a corresponding operation unit without excess overhead time.

Figure 5:
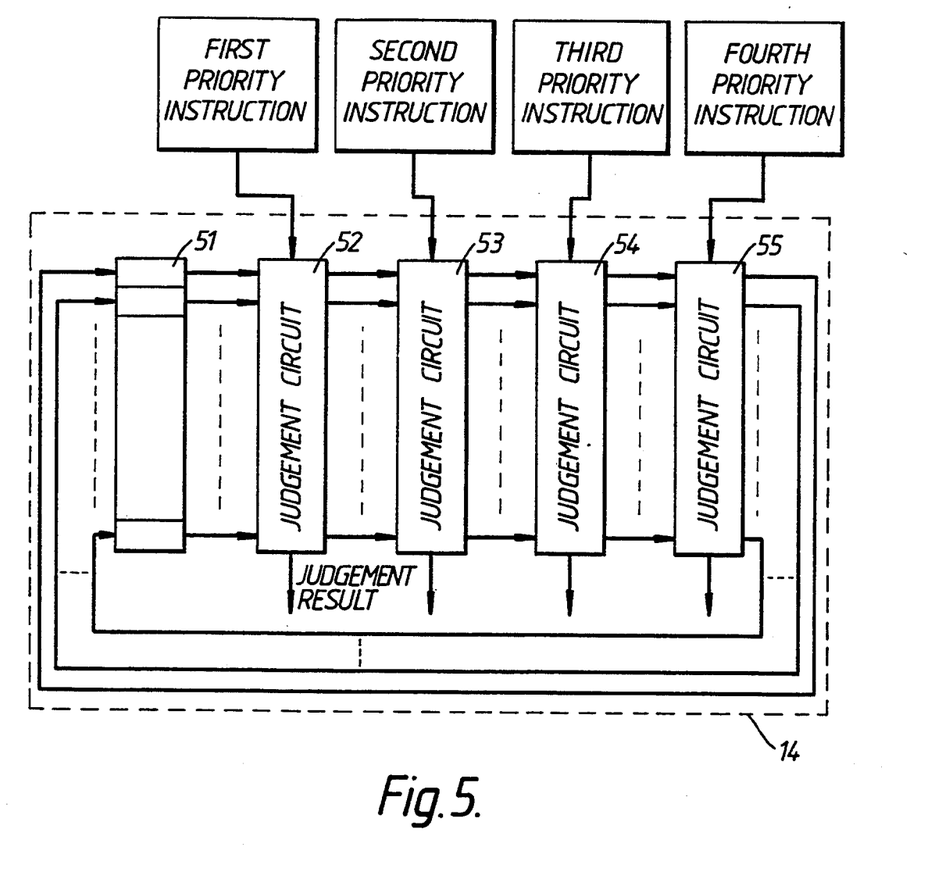
FIG. 5 shows a construction of a score board stored in a memory according to the present invention.

FIG. 5 shows a construction of the score board 14. The score board 14 includes a score board register 51 and four judgement circuits 52, 53, 54, 55, which are cyclically connected by corresponding bits. (A preferred embodiment has nine registers in register section 13.) The score board register 51 consists of bits corresponding to the registers in the register section 13, respectively. At the beginning, the score board 51 stores information concerning whether the previous four instructions had completed executing or not. If all bits of the score board register 51 are "0", the previous four instructions completed executing. If at least one bit of the score board register 51 is "1", the previous instruction was not finished executing. When all bits of the score board register 51 are "0", the four judgement circuits begin processing. The judgement circuit 52 receives the first priority instruction through the operation unit and detects the register number for writing the operation result, where the operation requires plural clock cycles. The judgement circuit 52 writes "1" in the bit corresponding to the register number if the operation requires plural clock cycles and sends the completion signal to the corresponding operation unit. The judgement circuit 53 receives the second priority instruction through the operation unit and detects the register number for writing the operation result, where the operation requires plural clock cycles and register number for reading data which is necessary for execution. The judgement circuit 53 receives the bit of the score board register 51 including the judgement result of the judgement circuit 52. If the bit corresponding to the register number for reading is set to "1", the judgement circuit 53 sends the wait signal to the corresponding operation unit. If the bit corresponding to the register number for reading is reset to "0", the judgement circuit 53 sends the completion signal to the corresponding operation unit. The judgement circuit 53 writes "1" in the bit corresponding to the register number for writing if the operation requires plural clock cycles. The judgement circuit 54 (corresponding to the third priority instruction) and the judgement circuit 55 (corresponding to the fourth priority instruction) perform the same processing as the judgement circuit 53. (The bit "1" of the score board register 51 is reset to "0" when the operation unit writes the operation result in the corresponding register.)

Figure 6:
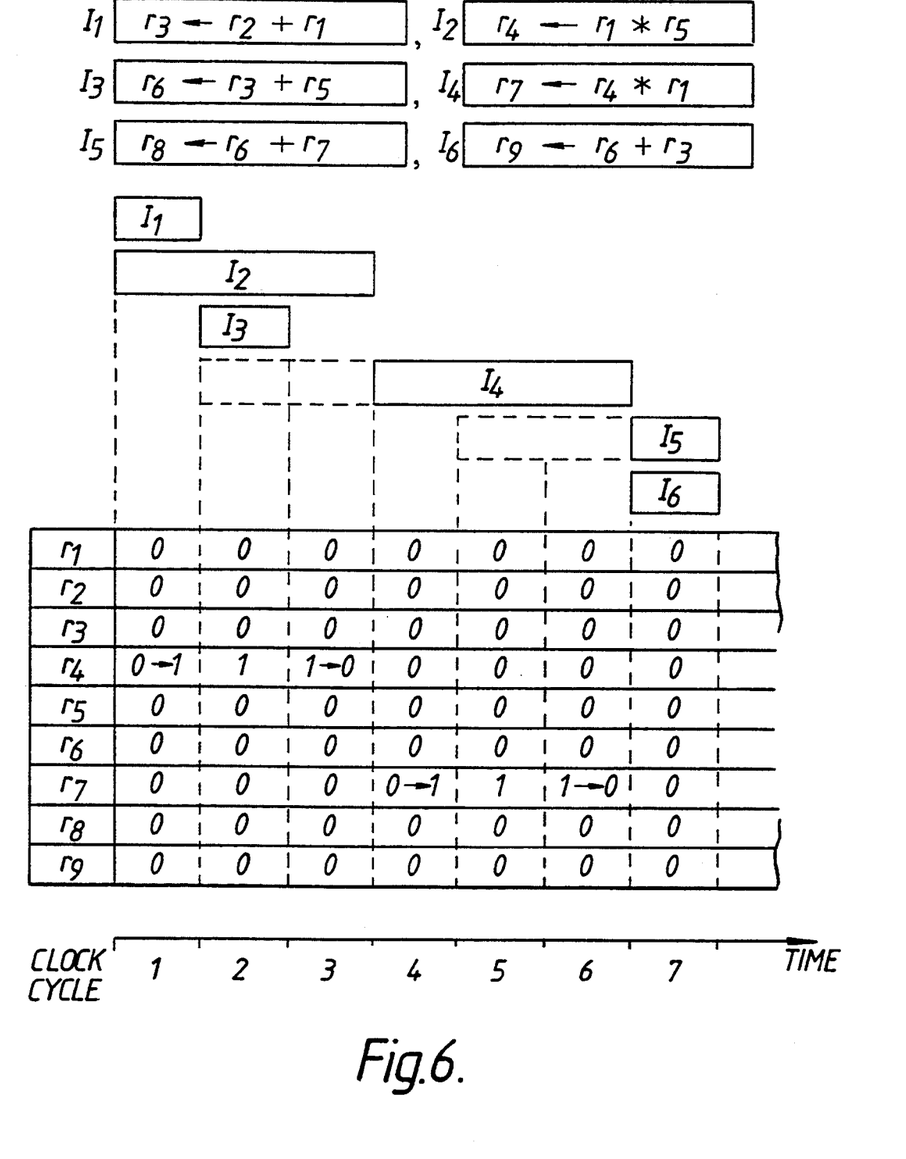
FIG. 6 shows an example of a score board for simultaneously executing the plural instructions according to the present invention.

FIG. 6 shows an example of the score board register 14 over time for simultaneously executing plural instructions. This example assumes that two instructions are simultaneously executed. As shown in an upper portion of FIG. 6, three groups of two instructions (I1, I2) (I3, I4) (I5, I6) are executed in order.

When first two instructions (I1, I2) are executed at clock cycle 1, all bits of the score board register are reset to "0". The read register (r1, r5) of the instruction (I2) is not different from the write register (r3) of the instruction (I1). Therefore, two instructions (I1, I2) are able to be executed simultaneously at clock cycle 1. However, the instruction (I1) is an add operation, which requires one clock cycle, and the instruction (I2) is a multiple operation, which requires three clock cycles. Therefore, the bit corresponding to the register (r4), which is a write register of the instruction (I2), is set to "1". When the next two instructions (I3, I4) are executed at clock cycle 2, the first instruction (I3) is immediately executed because the read register (r3, r5) is reset to "0". But the bit corresponding to the register (r4), which is the read register of the instruction (I4), is already set to "1". Therefore, the instruction (I4) waits to be executed. In short, when the execution of the instruction (I2) is finished at clock cycle 3, the bit "1" corresponding to the register (r4) is reset to "0". After the bit is reset, the instruction (I4) is immediately executed at clock cycle 4. At this time, the instruction (I4) is a multiple operation which requires three clock cycles. Therefore the bit corresponding to the register (r7), which is the write register of the instruction (I4), is set to "1".

When last two instructions (I5, I6) are executed at clock cycle 5, the bit corresponding to the register (r7), which is a read register of the first instruction (I5), was already set to "1". Therefore, the instructions (I5, I6) wait until the execution of the instruction (I4) is finished. After the bit "1" corresponding to the register (r7) is reset at clock cycle 6, the two instructions (I5, I6) are executed simultaneously at clock cycle 7.

The described embodiment contains a subset of four instructions. Other embodiments may contain a different number of instructions in a subset.

What is claimed is:

1. A computer for simultaneously executing plural instructions, comprising:
    plural types of operation units, each for executing one of a plurality of corresponding types of instructions;
    a main memory for pre-storing a plurality of instructions;
    decision means for deciding the types of operation unit for each instruction belonging to a subset of the plural instructions according to the types of instructions belonging to the subset of the plural instructions and for deciding whether simultaneous execution of the instructions belonging to the subset of the plural instructions is possible when the subset of the plural instructions are read from the main memory, wherein decisions of the decision means corresponding to the subset of the plural instructions are collectively called a decision result;
    a cache memory for temporarily storing the subset of the plural instructions and the decision result corresponding thereto; and
    assignment means for respectively assigning the instructions belonging to the subset of the plural instructions to corresponding types of the operation units according to the decision result stored in the cache memory,
    wherein said assignment means assigns the instructions belonging to a first subset of the plural instructions to the corresponding types of the operation units as soon as the first subset of instructions and the decision result corresponding to the first subset of instructions are stored in said cache memory, wherein said plurality of operation units begin executing instructions as soon as they are assigned thereto, and wherein subsequent subsets of the plural instructions are sequentially read out of said main memory.

2. The computer for simultaneously executing plural instructions according to claim 1, wherein the decision means determines that instructions of the subset of the plural instructions are to be simultaneously executed when the types of operation units required for executing the instructions are mutually different.

3. The computer for simultaneously executing plural instructions according to claim 1, wherein the decision means determines that instructions of the subset of the plural instructions are not to be simultaneously executed when at least two of the operation units required for executing the instructions are a same type.

4. The computer for simultaneously executing plural instructions according to claim 3, the decision means determines that instructions of the subset of the plural instructions are to be simultaneously executed in case that a number of the plural instructions whose types are the same is less than a number of the operation units whose type corresponds to the type of the plural instructions.

5. The computer for simultaneously executing plural instructions according to claim 1, wherein the assignment means is a distribution matrix for supplying an instruction to a corresponding operation unit according to the type of the operation unit and the possibility of simultaneous execution.

6. The computer for simultaneously executing plural instructions according to claim 1, wherein the plural instructions are repeatedly assigned to the corresponding operation units by the assignment means and executed by the corresponding operation units.

7. The computer for simultaneously executing plural instructions according to claim 1, further comprising a plurality of registers, where information in the plurality of registers is accessed by the operation units during execution.

8. The computer for simultaneously executing plural instructions according to claim 6, further comprising:
   a plurality of registers utilized by said units to store data during execution of instructions; and
   a score board, which has flags corresponding to respective ones of the registers for indicating whether the registers are monopolized by the execution of an instruction, wherein execution of a multiple clock cycle instruction by an operation unit causes at least one register to be monopolized for more than one clock cycle.

9. The computer for simultaneously executing plural instructions according to claim 8, wherein one of the flags in the score board, corresponding to a monopolized register is set according to a priority of the plural instructions.

10. The computer for simultaneously executing plural instructions according to claim 8, wherein an executed result is produced by a multiple clock cycle instruction and wherein the operation unit decides to write the executed result in the monopolized register or abandon the executed result, according to the flag corresponding to the monopolized register in the score board.

11. A computer for simultaneously executing plural instructions, comprising:
   plural types of operation units, each for executing one of a plurality of corresponding types of instructions;
   a main memory for pre-storing a plurality of instructions;
   decision means for deciding the type of operation unit for each instruction of a subset of the plural instructions according to the types of instructions belonging to the subset of the plural instructions and for deciding whether simultaneous execution of the instructions belonging to the subset of the plural instructions, which are to be repeatedly executed, is possible whenever several subsets of the plural instructions are read out from the main memory in order, wherein decisions of the decision means corresponding to the subset of the plural instructions are collectively called a decision result:
   a cache memory for temporarily storing the several subsets of the plural instructions and the decision result corresponding thereto; and
   assignment means for respectively assigning the instructions belonging to the subset of the plural instructions to corresponding types of operation units according to the decision result stored in the cache memory,
   wherein said assignment means assigns the belonging to a first subset of the plural instructions corresponding types of the operation units as soon as subset of instructions and the decision result the first subset of instructions are stored in said wherein said plurality of operation units begin executing instructions as soon as they are assigned thereto, and wherein subsequent subsets of the plural instructions are sequentially read out of said main memory.

* * * * *

UNITED STATES PATENT AND TRADEMARK OFFICE
CERTIFICATE OF CORRECTION

PATENT NO. : 5,377,339
DATED : December 27, 1994
INVENTOR(S) : Mitsuo SAITO et al It is certified that error appears in the above-indentified patent and that said Letters Patent is hereby corrected as shown below:

Claim 8, Column 7, Line 17 after "said" insert --operation--.

Claim 8, Column 7, Line 20, after "registers" insert --,--.

Claim 11, Column 8, Line 28, after "the" insert --instructions--.

Claim 11, Column 8, Line 29, after "instructions" insert --to the--.

Claim 11, Column 8, Line 31, before "subset", insert --the first-- and after "result" insert --corresponding to--.

UNITED STATES PATENT AND TRADEMARK OFFICE
CERTIFICATE OF CORRECTION

PATENT NO. : 5,377,339
DATED : December 27, 1994
INVENTOR(S) : Mitsuo Saito, et. al.

It is certified that error appears in the above-indentified patent and that said Letters Patent is hereby corrected as shown below:

Claim 11, Column 8, line 32, after "said" insert --cache memory,--.

Signed and Sealed this

Thirtieth Day of May, 1995

Attest:

BRUCE LEHMAN

Attesting Officer

Commissioner of Patents and Trademarks